Sept. 17, 1935.  C. H. HOCKNER  2,014,379
TESTING APPARATUS
Filed July 26, 1933  2 Sheets—Sheet 2

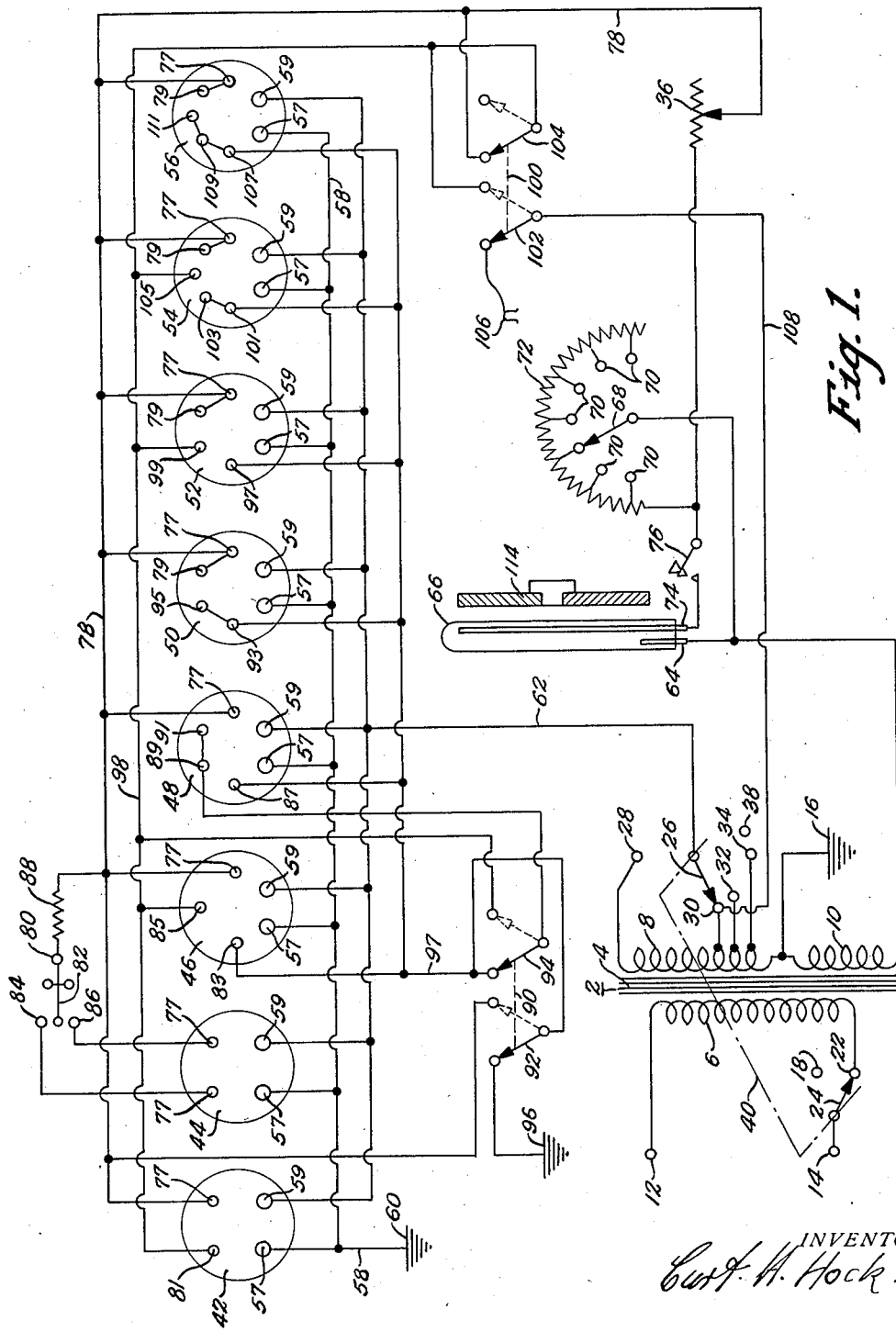

INVENTOR
Curt H. Hockner

Patented Sept. 17, 1935

2,014,379

UNITED STATES PATENT OFFICE 2,014,379

TESTING APPARATUS

Curt H. Hockner, Dayton, Ohio, assignor of one-sixth to C. P. Newberg, Miamisburg, Ohio, and five-sixths to The Dayton Acme Mfg. Co., Inc.

Application July 26, 1933, Serial No. 682,201

13 Claims. (Cl. 250—27)

This invention relates to testing apparatus, and the present embodiment of the invention relates more particularly to apparatus for testing vacuum tubes.

At the present time there are several devices being made and sold that are particularly adapted to the testing of vacuum tubes; however, due to the rapid change in the types of tubes and development of new tubes, these devices rapidly become obsolete. This brings about a necessity for apparatus for testing the new as well as the older types of vacuum tubes. While the increase in the number of types of tubes that are to be tested complicates the apparatus somewhat, it is very desirable that, while providing a good and accurate test of the value of the vacuum tubes, it must also be simple to operate and give an indication that is comprehensible to a person not particularly skilled in the art. At the same time, while it is not particularly practical to use instruments of extreme delicacy and precision in such apparatus that is to be used in stores or carried by service men, it is desirable that the instruments be rugged and that the apparatus provides a comparatively accurate quantitative indication of the value of the tube being tested, as well as an indication of whether the tubes test above or below a predetermined value. It is also desirable that the apparatus be comparatively inexpensive to produce.

It is therefore an object of the present invention to provide apparatus for the testing of vacuum tubes that will accommodate a wide variety of vacuum tubes, and at the same time be easy and simple to operate as well as inexpensive to manufacture. This is accomplished by providing a variety of sockets for accommodating a variety of tubes, and so connecting those sockets that by the use of comparatively few switches, a variety of potentials may be applied to the various terminals of the different sockets, and by utilizing an indicating device that provides an indication that is very easily read, as well as means for regulating the current that flows through the indicating device.

Another object of this invention is to provide apparatus for the testing of vacuum tubes which embodies a rugged indicating device that provides a quantitative indication of the value of the tube being tested. This is accomplished by providing a discharge tube indicating device of rugged construction that is so arranged that it provides a quantitative indication that may be judged with reference to a cooperating scale that is preferably direct or English reading.

Another object of this invention is to provide apparatus for testing vacuum tubes that will give a good indication of the value of vacuum tubes and that will give an indication of the value of the tubes under their operating conditions. This is accomplished by providing means for applying potentials to the tubes being tested that are comparable to the potentials actually applied to the tube under operating conditions.

Another object of this invention is to provide apparatus for testing vacuum tubes with which both half-wave rectifying elements of a rectifier may be separately and quantitatively tested, as well as the vacuum tubes having grid electrodes therein. This is accomplished by providing a socket for rectifier tubes and means for selectively connecting proper potentials to the different contacts thereof.

Another object of the invention is to provide apparatus for the testing of vacuum tubes that provides for the accommodation and testing of possible new tubes that may be developed in the future so that the apparatus is not rendered partially obsolete by the development of new tubes. This is accomplished by providing a variety of different kinds of sockets for accommodating the different tube bases, and means for applying a variety of potentials to the contacts of those sockets, as well as means for controlling the current flow through the indicating device to compensate for variations in the tube characteristics.

Another object of this invention is to provide apparatus for the testing of vacuum tubes that utilizes a substantially fixed alternating control grid potential for testing the different types of tubes having a control grid therein. This is accomplished by applying a substantially fixed alternating potential to the control grid of the tube being tested, and compensating for the different plate currents obtained with different tubes of vacuum tubes by preselecting a proper compensating resistor value in the indicator circuit to provide substantially uniform indicator current for all of the different types of vacuum tubes.

Another object of this invention is to provide means for compensating for variations in the gaseous discharge indication devices so that under predetermined conditions particular scale readings are obtained. This is accomplished by providing a compensating resistor that is preferably preadjusted for the particular indicating device, and that will hold that adjustment.

Another object is to provide apparatus for the testing vacuum tubes upon which the diode and triode parts of a duo-diode-triode vacuum tube may be easily and separately tested.

Other objects and advantages of this invention will be apparent from the accompanying specification and drawings, wherein one form of the present invention is clearly illustrated and described.

In the drawings:

Fig. 1 is a circuit diagram of an embodiment of a preferred form of the present invention.

Figure 4:
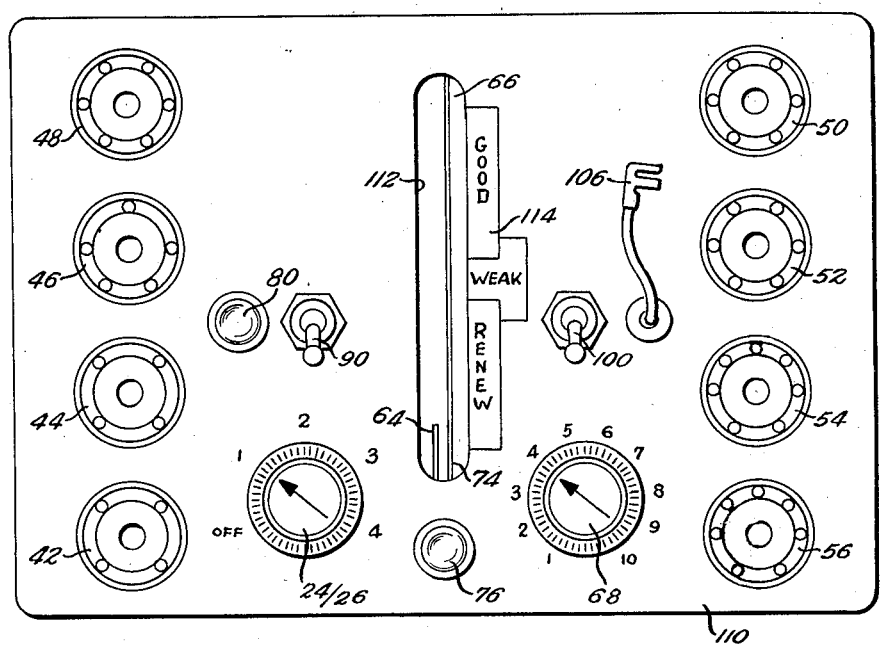
Fig. 4 is a plan view of one form of structural embodiment for the present invention.

With particular reference to Fig. 1, a transformer 2 has a core 4, a primary winding 6 and secondary windings 8 and 10. The primary winding 6 is adapted to be connected to suitable source of potential through terminals 12 and 14, which source provides the power for operating the tube being tested. The connection between the primary winding 6 and the terminal 14 is preferably made through a switch 24 having contacts 18 and 22, of which the contact 18 is dead and provided for opening the primary circuit. The secondary windings 8 and 10 are connected together, and their common connection is connected to ground at 16. A movable switch arm 26 selectively makes connection with switch contacts such as 28, 30, 32 and 34 that are connected to taps on the secondary winding 8, which winding is preferably a low voltage winding for providing heater or filament potential for the tube being tested. The control grid potential for the tube being tested is preferably provided by connecting to a tap such as 30 on the secondary winding 8, which provides a potential that is substantially 180 degrees out of phase with the anode potential. A dead contact 38 is provided for the switch arm 26 to provide an off position for the switch, and the switch 24 is preferably actuated by the movement of the switch arm 26 between the contacts 34 and 36. This is accomplished by a link connection 40 between the switches.

A plurality of sockets 42, 44, 46, 48, 50, 52, 54 and 56 are provided to accommodate all of the different types of vacuum tubes that the present device is capable of testing. One of the filament or heater terminals 57 on each of the sockets is grounded at 60 through a lead 58. The other of the filament or heater terminals 59 on each of the sockets are connected to the movable switch arm 26 through a lead 62; hence, any of the various voltages provided by the taps on the secondary winding 8 may be applied to any of the filament or heater terminals of the sockets through the selective connection provided by the movable switch arm 26, the other connection to those filament or heater terminals being made to ground and the connections at 16 and 60.

The high potentials are provided to the tube being tested by the secondary winding 10. One end of the secondary winding is connected to an electrode 64 of a discharge tube 66 and also to a movable switch arm 68, which switch arm may be selectively connected to taps 70 on a resistor 72. The other end of the high potential winding is connected to ground at 16, so that one side of the high potential is applied to the grounded side of the filament, or to the grounded cathode of the tube being tested. Another electrode 74 of the discharge tube 66 is connected to one end of the resistor 72 through a switch 76 that is preferably biased to the open position. The electrode 74 is also connected to the anode or plate terminals 77 of each of the sockets through the switch 76, a variable resistor 36 and a lead 78. Pentode, screen or suppressor grid terminals 79 on the sockets 50, 52, 54 and 56 are connected to the anode terminals 77. The tapped resistor 72 forms a variable shunt across the discharge tube 66 so that the current flow through the discharge tube may be regulated in accordance with the type of tube being tested, and the switch 76 in series with the discharge tube is provided so that connection to the discharge tube is made only when it is desired to obtain an indication of the value of the tube being tested.

By providing the combination of sockets shown, all of the various types of the receiving tubes may be accommodated, and an indication of their value obtained. For instance, the socket 42, having a grid or control electrode terminal 81, is provided for the accommodation of various types of four prong tubes having a grid or control electrode; while the socket 44 is provided for the accommodation of rectifier tubes. In order to obtain separate tests on each of the half-wave rectifying elements of a full-wave rectifier tube, a switch 80 having a movable contact arm 82 engageable with either of two contacts 84 and 86 and normally biased to a neutral or off position between the contacts is provided for selectively making connections to either of those half-wave rectifying elements. The movable switch arm 82 of the switch 80 is connected, preferably through a resistor 88, to the lead 78, through which the high potential is provided from the secondary winding 10.

The sockets 46, 48, 50, 52, 54 and 56 are provided for tubes having different numbers of elements and prongs, and different elements connected to the different prongs, and terminals such as 83 and 85 on the socket 46; 87, 89 and 91 on socket 48; 93 and 95 on the socket 50; 97 and 99 on the socket 52; 101, 103 and 105 on the socket 54; 107, 109 and 111 on the socket 56 are adapted to have different potentials applied thereto in making tests on different types of tubes. Then, different types of tubes having the same number of prongs with different elements connected to those prongs are accommodated in certain of these sockets by providing for the connection of different potentials to some of the terminals on the various sockets. For instance, a switch 90 having switch arms 92 and 94, when the switch arms are in the position indicated by the solid lines in the drawings, connects one terminal of each of the sockets 46, 48 and 52, as well as two connected terminals 93 and 95 and 101 and 103 on the sockets 50 and 54, respectively, and three connected terminals 107, 109 and 111 on the socket 56 to ground at 96, and also connects two connected terminals 89 and 91 of the six prong socket 48 to ground at 96. In the position indicated by the dotted lines, the switch arm 92 of the switch 90 connects the terminals of the sockets 46, 48, 50, 52, 54 and 56, that were grounded in first position through a lead 97, to the high voltage lead 78; and the switch arm 94 connects the connected terminals 89 and 91 of the socket 48, that were grounded in the first position, to a lead 98.

Another switch 100, having switch arms 102 and 104, when in the position indicated by the solid lines in the drawings, connects a bias voltage from a tap such as 30 on the secondary winding 8 to a grip clip 106 through a lead 108 and the switch arm 102; and connects the high voltage lead 78 to terminals 81, 85, 99 and 105 on the sockets 42, 46, 52 and 54 respectively, through the switch arm 104 and lead 98. When the switch 100 is in the position indicated by the dotted lines, the bias voltage provided through the lead 108 is disconnected from the grip clip 106, and connected to terminals 81, 85, 99 and 105 on the sockets 42, 46, 52 and 54, respectively, through the switch arm 102 and the lead 98; while the switch arm 104 disconnects the high voltage lead 78 from the lead 98.

Figure 2:
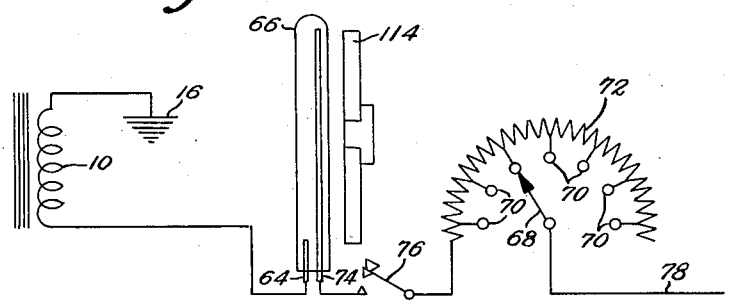
Fig. 2 is a modification of a part of the circuit, the remainder of which circuit is preferably substantially the same as shown in Fig. 1.

With particular reference to Fig. 2, reference numerals similar to those used in Fig. 1 refer to similar parts that perform similar functions; however, in this figure, the resistor 72 is connected in series with the gaseous discharge tube 66 and lead 78, so that the current flow through the discharge tube 66 is controlled by the resistor being connected in series rather than across the discharge tube.

Figure 3:
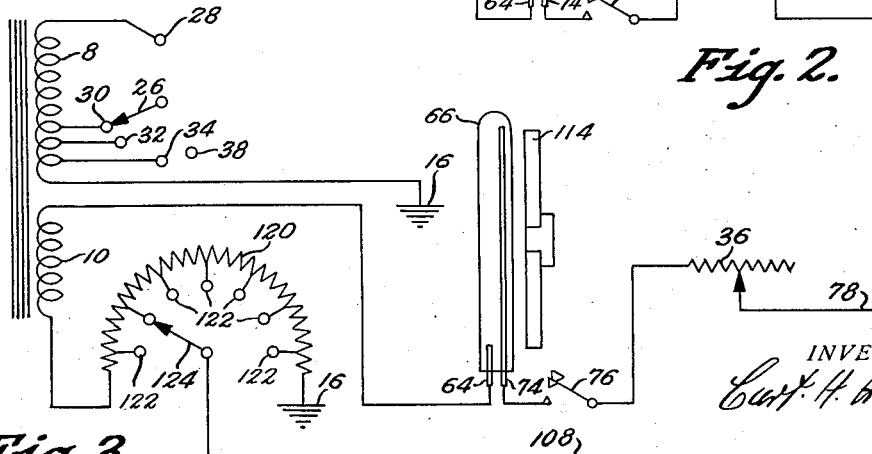
Fig. 3 is another modification of a part of the circuit, the remainder of which circuit is preferably substantially the same as that shown in Fig. 1.

With particular reference to Fig. 3, reference numerals similar to those used in Fig. 1 refer to similar parts that perform similar functions; however, in this modification, a resistor 120 having taps 122 selectively connectable with a switch arm 124 is connected in series with one end of the secondary winding 10 and ground at 16; while the switch arm is connnected to the lead 108. This tapped resistor thus provides a variable grid or control electrode bias for equalizing the indications obtained with different types of vacuum tubes so that regardless of the type of the tube being tested, the value may be read on the same English or direct reading scale.

With particular reference to Fig. 4, reference numerals similar to those previously used refer to similar parts that perform similar functions. This figure, however, illustrates a structural embodiment of the parts shown diagrammatically in Fig. 1 in which the sockets, switches and parts are mounted on a panel 110. The discharge tube 66 is preferably mounted under the panel 110 so that it is visible through an aperture 112 in the panel. A scale is preferably provided on the panel adjacent the aperture 112 so the quantitative determination of the value of the tube being tested is easily visible and readable. The quantitative determination is obtained by virtue of the electrode 74 extending longitudinally of the tube 66 and substantially parallel to the scale so that the glow extends along the electrode 74 a distance dependent upon the current flow through the discharge tube, which current depends upon the tube being tested. The electrode 64 is preferably located at one end of the tube.

In the operation of this apparatus, after the connection is made to a suitable source of potential through the leads 12 and 14, the tube to be tested is placed in the proper socket. It is preferable to start with the switch arms 24 and 26 set on the contacts 18 and 38 respectively, and to gradually move the switch 26 until the proper tap is selected by the switch arm 26 to provide the proper filament or heater voltage for the tube being tested. Movement of the switch arm 26 to the tap 34 preferably moves the arm 24 to the contact 22. The secondary winding 10 is wound with a predetermined number of turns so that it provides a suitable high voltage testing potential for all of the different types of tubes, and a potential sufficient to provide a proper operating potential for the gaseous discharge tube 66 when the switch arm 68 is set at a position dependent upon the characteristics of the tube being tested. The taps on the resistor 72 are preferably connected to predetermined points on the resistor 72 to permit preselection of the proper resistance value for the particular type of tube being tested. The switch 76 preferably maintains the circuit to the discharge tube open until it is desired to obtain a reading on the tube being tested. In the modification shown in Fig. 3, however, the tapped resistor 120 and switch arm 124 eliminate the necessity of a resistor 72, and provide a means for preselecting a bias potential for the tubes having a grid or control electrode, and thereby makes possible similar scale readings on the indicating device for different types of tubes.

Due to the large variety of tubes to be tested, and to reduce the number of sockets necessary to test those tubes, the switches 90 and 100 are provided to change the potentials applied to some of the terminals of the different sockets so that different types of tubes may be tested in the same socket. For instance, the type 224 and type 227 tubes are commonly known types each having similar five prong bases. However, the elements of these two types of tubes that are connected to similar prongs on the base differ. Hence, in order to accommodate such different types of tubes in a single socket such as 46, the connections to the terminals of that socket must be changed. In the case of a 227 tube, the switch 100 is set in the position indicated by the dotted lines so that the grid bias or potential provided by the secondary winding 8 through the leads 108 and 98 is connected to the grid terminal on the socket. The anode or plate potential is applied to the plate terminal on the socket through the lead 78, while the cathode terminal is grounded at 96 through the switch arm 92 of the switch 90, which latter switch is in the position indicated by the solid lines. Then, in testing the type 224 tube, the switch 90 remains in the position indicated by the solid lines so that the cathode is grounded at 96. However, the switch 100 is set to the position indicated by the solid lines so that the grid bias or potential is connected to the grid of the tube through the grid clip 106. The switch 100 also connects the screen grid and plate together and to the high potential lead 78.

As another example, the type 247 tube is also a five prong tube, but has different terminal connections than either the 224 or 227 type tubes. In testing these tubes, the switch 90 is set to the position indicated by the dotted line so that the high potential lead 78 is connected to the pentode grid terminal through the switch arm 92. The switch 100 is set to the position indicated by the dotted lines so that the grid bias or potential is applied to the grid terminal through the leads 98 and 108 and switch arm 102. These examples illustrate the variety of types of tubes that can be accommodated and tested in a single socket, as well as the operation of the switches in testing different types of tubes. It is understood, of course, that the different heater or filament potentials for the different types of tubes are provided through properly setting the switch 26. Except for the testing of rectifier tubes, these examples also illustrate the operation of the device so that the testing of other types of tubes in the other sockets will be apparent to those skilled in the art.

The socket 44 is provided for the testing of rectifier tubes, and the switch 80 is provided so that the half-wave rectifying element of a full-wave rectifier tube may be separately tested. The resistor 89 is preferably provided in series with the switch 80 and the lead 78 to limit the current flow through the lead 78 so that a smaller resistor 72 may be used without danger of overheating that resistor. The resistor 89 also makes possible the use of a resistor 72 having a lower range of resistance variation, due to the wide difference between the current values measured for rectifier and other types of tubes.

Due to the variations that occur in the gaseous discharge tube indicating devices as they are made in quantities, it is necessary to provide a means for preadjusting the apparatus to compensate for those variations, so that similar scale readings are obtained on different apparatus under predetermined conditions, or when the tubes are replaced. Hence, the variable resistor 86 is provided and is preferably preadjusted at the factory under predetermined conditions.

It has been found that to separately test the diode and triode parts of a duo-diode-triode tube, that by removing the grid clip 106 a test is obtained on the diode part and by connecting the grid clip 106 to the grid terminal, a test is obtained on the triode part.

It has also been found that through providing the switches 99 and 100 so that the cathodes may be grounded and the high potential applied to the screen, pentode or suppressor grid of pentode or screen grid tubes, a more accurate test of the true value of the tested tube is obtained. This feature is contrasted particularly to those testers that tie the control grid, and screen grid or pentode grid together.

It may be noted that a substantially fixed alternating grid potential is utilized in testing all of the different types of tubes except rectifiers in the modifications shown in Figs. 1 and 2. This feature makes necessary the use of the resistor 72 in series with, or across, the gaseous discharge tube indicating device to compensate for the different plate current values obtained in testing different types of tubes, rather than endeavoring to obtain uniform plate current values for all of the different types of tubes by properly selecting the bias potential applied to all of the different types.

Although the invention illustrated and described represents preferred forms or embodiments, others may be used, all coming within the scope and spirit of the claims which follow.

What is claimed is:

1. Apparatus for testing vacuum tubes having elements therein, comprising, in combination, a plurality of sockets having terminals thereon for making connections to the elements of the vacuum tube being tested; a transformer having a primary winding, and a pair of connected secondary windings, one of which secondary winding is tapped for providing various potentials; means for connecting the primary winding to a source of potential; means for selectively applying the various potentials from the tapped secondary winding to a pair of terminals on each of the sockets; a control grid clip; switch means for selectively applying a potential from a tap on said tapped secondary winding to either the control grid clip or terminals on some of the sockets; means for normally applying the potential of the other secondary winding to one or more terminals on all but one of the sockets; a switch for selectively connecting the said other secondary winding to either of two terminals on said one socket; a switch for selectively applying the potential from said other secondary winding to additional terminals on some of the sockets; another switch for selectively changing the socket terminals to which some of the potentials are applied; gaseous discharge indicating means connected in series with said other secondary winding for indicating the value of the vacuum tube being tested; and means electrically connected to the indicating means for limiting the current flow through the indicating means by an amount dependent upon the type of tube being tested.

2. Apparatus for testing vacuum tubes having elements therein, comprising, in combination, a plurality of sockets having terminals thereon for making connections to the elements of the vacuum tube being tested; a transformer having a primary winding, and a pair of connected secondary windings, one of which secondary windings is tapped for providing various potentials; means for connecting the primary winding to a source of potential; means for selectively applying the various potentials from the tapped secondary winding to a pair of terminals on each of the sockets; a control grid clip; switch means for selectively applying a potential from a tap on said tapped secondary winding to either the control grid clip or terminals on some of the sockets; means for normally applying the potential of the other secondary winding to one or more terminals on all but one of the sockets; a switch for selectively connecting the said other secondary winding to either of two terminals on said one socket; a switch for selectively applying the potential from said other secondary winding to additional terminals on some of the sockets; another switch for selectively changing the socket terminals to which some of the potentials are applied; indicating means connected in series with said other secondary winding for indicating the value of the vacuum tube being tested; and means electrically connected to the indicating means for limiting the current flow through the indicating means by an amount dependent upon the type of tube being tested.

3. Apparatus for testing vacuum tubes having elements therein, comprising, in combination, a plurality of sockets having terminals thereon for making connections to the elements of the vacuum tube being tested; a transformer having a primary winding, and a pair of connected secondary windings, one of which secondary windings is tapped for providing various potentials; means for connecting the primary winding to a source of potential; means for selectively applying the various potentials from the tapped secondary winding to a pair of terminals on each of the sockets; a control grid clip; switch means for selectively applying a potential from a tap on said tapped secondary winding to either the control grid clip or terminals on some of the sockets; means for normally applying the potential of the other secondary winding to one or more terminals on all but one of the sockets; a switch for selectively connecting the said other secondary winding to either of two terminals on said one socket; a switch for selectively applying the potential from said other secondary winding to additional terminals on some of the sockets; another switch for selectively changing the socket terminals to which some of the potentials are applied; gaseous discharge indicating means connected in series with said other secondary winding for indicating the value of the vacuum tube being tested; and means for limiting the current flow through the indicating means by an amount dependent upon the type of tube being tested.

4. Apparatus for testing vacuum tubes comprising, in combination, a plurality of sockets for accommodating a variety of types of vacuum tubes having different bases, each of said sockets having filament and plate terminals, and some of said sockets having control grid terminals; a transformer having a primary winding, a high voltage secondary winding and a tapped low voltage secondary winding, said low voltage secondary winding having an end connected to one of the filament terminals of each socket; switch means for selectively connecting the taps on the low voltage secondary winding to the other filament terminals; a plate circuit for applying the potential from the high voltage secondary winding to the plate terminals; means for applying an alternating potential to the control grid terminals so that the control grid potential is substantially 180 degrees out of phase with the plate potential; means for connecting said primary winding to a source of alternating current; gaseous discharge tube means in said plate circuit for providing a graduated quantitative indication of the value of the vacuum tube being tested; and a variable resistor connected across the gaseous discharge tube means for limiting the current flow through the gaseous discharge tube means in testing various types of vacuum tubes and calibrated to be accurate with the gaseous discharge tube means with which it is used.

5. Apparatus for testing vacuum tubes comprising, in combination, a plurality of sockets for accommodating a variety of types of vacuum tubes having different bases, each of said sockets having filament and plate terminals, and some of said sockets having control grid terminals; a transformer having a primary winding, a high voltage secondary winding and a tapped low voltage secondary winding, said low voltage secondary winding having an end connected to one of the filament terminals of each socket; switch means for selectively connecting the taps on the low voltage secondary winding to the other filament terminals; a plate circuit for applying the potential from the high voltage secondary winding to the plate terminals; means for applying an alternating potential to the control grid terminals so that the control grid potential is substantially 180 degrees out of phase with the plate potential; means for connecting said primary winding to a source of alternating current; gaseous discharge tube means in said plate circuit for providing a graduated quantitative indication of the value of the vacuum tube being tested; and a variable resistor connected in series with the gaseous discharge tube means for limiting the current flow through the gaseous discharge tube means by an amount dependent upon the characteristics of the gaseous discharge tube used.

6. Apparatus for testing vacuum tubes having elements therein, comprising, in combination, a plurality of sockets having terminals thereon for making connections to the various elements of the vacuum tube being tested; a transformer having a primary winding, a high voltage secondary winding, and a tapped low voltage secondary winding; means for connecting the primary winding to a suitable source of potential; a circuit for connecting the high voltage winding to one or more terminals on each of the sockets except one, and means for selectively connecting said circuit and winding to each of two terminals on said one socket; a gaseous discharge indicating device in said circuit for indicating the value of the tube being tested; a variable resistor connected in series with one of the secondary windings and having cooperating switch means for selectively preselecting the potential applied to one of the elements of the vacuum tube to be tested so as to thereby preselect the limiting current flow values of the discharge tube to proper amounts for the particular discharge tube being used; and means for selectively applying potentials from the tapped low voltage secondary winding to a pair of terminals on each socket.

7. In apparatus for testing vacuum tubes, the combination comprising, sockets having terminals for making connections to said vacuum tubes, means for applying testing potentials to said terminals, a gaseous discharge tube indicating device for providing a quantitative indication of the value of the tube being tested, said discharge device including a substantially tubular container having electrodes sealed therein, one of said electrodes extending axially and substantially the full length of the tubular container along which electrode the discharge glow progresses a distance proportional to the value of the tube being tested, and the other of said electrodes being confined to one end of the tubular container; a scale adjacent the discharge tube for indicating the vacuum tube value; variable means electrically connected to the discharge tube for limiting the current flow limits for the discharge tube to values dependent upon the type of tube tested and a variable resistor preadjusted to effect a predetermined length of glow with a predetermined current flow thru the discharge tube, whereby manufacturing variations in discharge tubes are compensated for.

8. In apparatus for testing vacuum tubes, the combination comprising, sockets having terminals for making connections to the tube being tested, means providing test potentials for the tubes being tested, a circuit connecting said means to said terminals, a gaseous discharge tube indicating device connected in said circuit for providing a quantitative indication of the value of the tube being tested, said discharge device including a substantially tubular container having electrodes sealed therein, one of said electrodes extending axially and substantially the full length of the tubular container along which electrode the discharge glow progresses a distance proportional to the value of the tube being tested, and the other of said electrodes being located at one end of the tubular container; a scale adjacent the discharge tube for indicating the vacuum tube value; means for preadjusting said apparatus so that the flow progresses a predetermined distance along the scale under predetermined conditions, said means for preadjusting said apparatus compensating for differences in different discharge devices; and variable preadjustable means for preselecting the current flow limits for the discharge tube to values dependent upon the type of tube tested.

9. In apparatus for testing vacuum tubes, the combination comprising, a gaseous discharge tube indicating device providing a quantitative indication of the value of the tube being tested, means for preadjusting the apparatus to provide a predetermined current range for the discharge tube regardless of the type of tube to be tested, and means for preadjusting the apparatus to provide a predetermined indication on the discharge tube under predetermined conditions, the last mentioned means effecting substantial uniformity of indications regardless of variations in discharge tubes as manufactured.

10. In apparatus for testing vacuum tubes, the combination comprising, a gaseous discharge tube indicating device, and an adjustable resistor connected to the discharge tube for adjusting the indication obtained under predetermined conditions, whereby compensation is effected for variations in gaseous discharge tubes as manufactured.

11. Apparatus for testing vacuum tubes having elements including a control electrode therein, comprising, in combination, means for making connections to the elements of any one of a plurality of types of vacuum tubes; gaseous discharge tube means providing a visual graduated quantitative indication of the value of the vacuum tube being tested; means for applying suitable testing potentials to said elements, said last mentioned means including a tapped resistor having cooperating switching means for preselecting a gaseous discharge tube breakdown potential corresponding to the type of tube being tested, and which potential limits the current flow through the indicating means to a value between predetermined limits and means for effecting a predetermined indication under predetermined conditions to compensate for variations that inadvertently ocur in the manufacture of gaseous discharge tubes.

12. Apparatus for testing vacuum tubes having elements therein, comprising, in combination, means for making connections to any one of a plurality of types of vacuum tubes including rectifier tubes; gaseous discharge tube means providing an indication of the value of the vacuum tube being tested; means for applying suitable testing potentials to said elements; a resistor for limiting the current flow through the gaseous discharge tube means when a rectifier tube is being tested; means for preselecting the limiting current flow values for the gaseous discharge tube when a tube other than a rectifier tube is being tested, and means for compensating for differences in characteristics of gaseous discharge tubes that occur in said discharge tubes as manufactured.

13. Apparatus for testing vacuum tubes having elements therein, comprising, in combination, means for making connections to any one of a plurality of types of vacuum tubes including rectifier tubes; gaseous discharge tube means providing an indication of the value of the vacuum tube being tested; means for applying suitable testing potentials to said elements; a resistor for limiting the current flow through the gaseous discharge tube means when a rectifier tube is being tested; means for preselecting the limiting current flow values for the gaseous discharge tube when a tube other than a rectifier tube is being tested; and adjustable means for preadjusting the indication obtained on the gaseous discharge means under predetermined conditions so that variations in said discharge tubes that occur in the tubes as manufactured do not effect corresponding errors in the indications of vacuum tube values.

CURT H. HOCKNER.